United States Patent [19]

Ohta

[11] 3,994,533
[45] Nov. 30, 1976

[54] INERTIA-TYPE HYDRAULIC BRAKE PRESSURE CONTROL VALVE

[75] Inventor: Yoshimoto Ohta, Ichikawa, Japan

[73] Assignee: Tokico Ltd., Japan

[22] Filed: Aug. 4, 1975

[21] Appl. No.: 601,386

[30] Foreign Application Priority Data

| Aug. 9, 1974 | Japan | 49-91239 |
| Aug. 13, 1974 | Japan | 49-92491 |
| Dec. 28, 1974 | Japan | 50-1176 |

[52] U.S. Cl. ............... 303/6 C; 188/349; 303/24 C; 303/24 F
[51] Int. Cl.² ............... B60T 8/14; B60T 8/24; B60T 8/26
[58] Field of Search ............... 303/6 C, 24, 6 R, 22; 188/349, 195

[56] References Cited
UNITED STATES PATENTS

| 3,143,125 | 8/1964 | Stelzer | 303/6 C X |
| 3,147,046 | 9/1964 | Stelzer | 303/6 C X |
| 3,163,473 | 12/1964 | Stelzer | 303/24 F X |
| 3,252,740 | 5/1966 | Stelzer | 303/6 C |
| 3,317,251 | 5/1967 | Hambling et al. | 303/24 F X |
| 3,359,729 | 12/1967 | Guettier | 303/6 C X |
| 3,398,757 | 8/1968 | Milster | 303/6 C |
| 3,455,609 | 7/1969 | Bratten | 303/24 C |
| 3,476,443 | 11/1969 | Bratten et al. | 303/24 C |
| 3,760,841 | 9/1973 | Daffron | 303/6 C X |

*Primary Examiner*—Trygve M. Blix
*Assistant Examiner*—Douglas C. Butler
*Attorney, Agent, or Firm*—Wenderoth, Lind & Ponack

[57] ABSTRACT

A hydraulic brake pressure control valve includes a first pressure chamber connectable with a source of hydraulic pressure such as a master cylinder, a second pressure chamber connectable with a rear wheel brake cylinder, a fluid passage for communicating the pressure chambers with each other, and an inertia valve for preventing communication through the fluid passage when deceleration of the vehicle exceeds a predetermined value. The control valve further includes a plunger slidably disposed in a bore, the opposite ends of which are exposed to hydraulic pressure in the first and second pressure chambers respectively. A piston is slidably disposed in a bore and has one end which is exposed to hydraulic pressure in the first pressure chamber and another end which is exposed to atmospheric pressure or gas pressure. A first spring acts on the piston against hydraulic pressure in the first pressure chamber, and a second spring moves the plunger toward the first pressure chamber when the piston is moved against the spring force of the first spring.

5 Claims, 8 Drawing Figures

INERTIA-TYPE HYDRAULIC BRAKE PRESSURE CONTROL VALVE

DESCRIPTION OF THE PRIOR ART

The present invention relates to a hydraulic brake control valve adapted to vary its operating characteristics depending on whether the vehicle is vacant or loaded.

Many vehicle brakes have been adapted for relying on fluid pressure and designed to apply equal pressure to the front and rear wheel brakes when a brake pedal is depressed by a driver of the vehicle. But in such case there is a tendency for the rear wheel to become locked prior to the locking of the front wheel whereby the vehicle is subject to the danger of the so called tail-wagging phenomenon.

To remedy such shortcomings, it is a common practice in the art to use a mechanism or arrangement constructed so that a hydraulic control valve is disposed between a source of pressure fluid such as a pedal-operated master cylinder and the rear wheel brake cylinder to prevent the rear wheel from being locked prior to the locking of the front wheel.

In a conventional hydraulic control valve of this kind, an inertia valve is provided to prevent the supply of fluid pressure to the rear wheel brake cylinder when deceleration of the vehicle or the braked rear wheel exceeds a predetermined value (cut-off pressure). The problem associated with this construction if used in a truck or the like is that the above mentioned cut-off pressure will be changed dependent on "loaded" and "unloaded" or "vacant" conditions of the truck. Conventional inertia valves cannot function to feed a substantially high pressure to the rear wheel brake cylinder in the "loaded" condition and a relatively low pressure in the "unloaded" condition. One of the prior art systems for solving this problem has contemplated the use of a load detection system such as a link mechanism or the like which detects a cargo weight and imparts a signal to the control valve for changing the operational characteristics of the valve in response to the load of the vehicle. This arrangement requires a complicated load detection system and thus the mounting of the control valve on the vehicle is complicated. As a result of this arrangement, such valve structure is rendered not only insufficient with regard to safety, adjustment, durability, mounting, and maintenance requirements but also is expensive to produce.

BRIEF SUMMARY OF THE INVENTION

An object of the invention is to provide a hydraulic brake control valve which is capable of exhibiting its operational characteristics in response to the load of the vehicle without requiring an external mechanical or electrical linkage.

It is a further object of the invention to provide a hydraulic brake control valve which overcomes the several noted shortcomings of the conventional control valve of the general character referred to above.

According to the present invention, a hydraulic brake pressure control valve includes a first pressure chamber connectable with a source of hydraulic pressure such as a master cylinder, a second pressure chamber connectable with a rear wheel brake cylinder, a fluid passage for communicating the pressure chambers with each other, and an inertia valve for preventing communication through the fluid passage when deceleration of the vehicle exceeds a predetermined value. The control valve further comprises a plunger slidably disposed in a bore. The opposite ends of the bore are exposed to hydraulic pressure in the first and second pressure chambers respectively. A piston is slidably disposed in a bore, and one end of the piston is exposed to hydraulic pressure in the first pressure chamber, and the other end of the piston is exposed to a reference pressure such as atmospheric pressure or a predetermined gas pressure. A first spring acts on the piston against hydraulic pressure in the first pressure chamber, and a second spring moves the plunger toward the first pressure chamber when the piston is moved against the spring force of the first spring.

A third spring may be provided for exerting a spring force on the plunger such that when communication between the pressure chambers is cut off by the inertia valve the third spring acts to resist the movement of the plunger towards the second pressure chamber, thereby increasing pressure in the rear wheel braking cylinder at a rate lower than in the master cylinder.

A stopper may be formed for limiting movement of the plunger towards the second pressure chamber, thereby acting to maintain pressure in the rear wheel brake cylinder at a constant value irrespective of an increase in pressure in the master cylinder when communication between the pressure chambers has been cut off.

Preferably the inertia valve comprises a ball-type valve member movably guided along a path which is inclined relative to the longitudinal axis of the vehicle such that when deceleration of the vehicle exceeds a predetermined value the ball moves up the inclined path and engages with a valve seat for closing the passage.

In such case, it is desired to provide a by-pass passage means or means preventing the closure of the inertia valve to assure a minimum required pressure for the rear wheel brake cylinder when the vehicle is running down a slope having an inclination larger than that of the moving path of the valve member of the inertia valve.

Preferably, the by-pass passage means comprises a second piston slidably disposed in a bore communicating with the second pressure chamber, a spring urging the second piston against hydraulic pressure in the second pressure chamber, and a valve member mounted on or associated with a valve member which is adapted to open or close a by-pass passage connecting the first and second pressure chambers, whereby a minimum guarantee pressure is assured in the rear wheel brake cylinder when the vehicle is running down a steep slope such that the inertia valve member could close the associated valve seat by its own weight.

The second piston may be associated with the inertia valve such that a valve actuating member such as an actuating rod is secured to the second piston and projects normally into the moving path of the inertia valve member for preventing closure of the inertia valve ad retracts therefrom when pressure in the second pressure chamber reaches the minimum guarantee pressure.

BRIEF DESCRIPTION OF THE DRAWINGS

Preferred embodiments of the present invention will now be explained with reference to the accompanying drawings, in which.

DETAILED DESCRIPTION OF PREFERRED EMBODIMENTS

Figure 1:
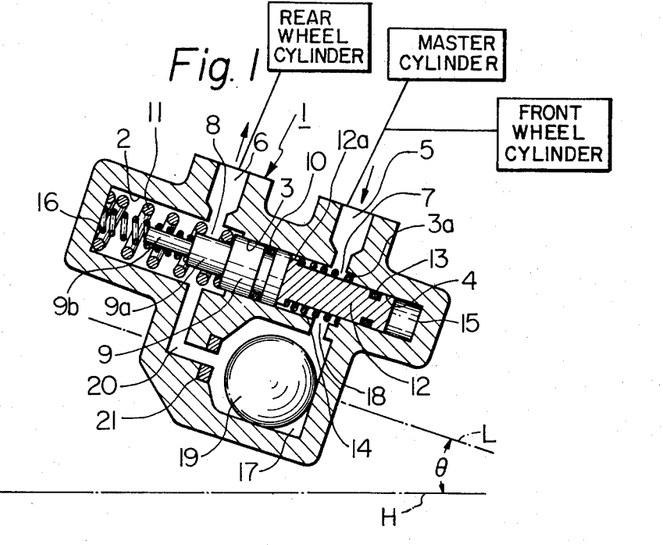
FIG. 1 is a longitudinal cross-section of a hydraulic pressure control valve of this invention.

Referring to FIG. 1, numeral 1 designates a hydraulic control valve body which is provided with a larger bore 2, an intermediate cylinder bore 3 of a smaller diameter then the bore 2, and a smaller cylinder bore 4 concentrically of the longitudinal axis of the valve body, both the bores 2 and 4 being closed at one of the respective ends thereof.

Numeral 5 denotes a fluid inlet port which is connected to a source of hydraulic fluid such as a master cylinder and also to a wheel cylinder of the front wheel of a vehicle. Numeral 6 is a fluid outlet port which is connected to a brake cylinder for a rear wheel of the vehicle. The inlet and outlet ports 5, 6 are in communication, as will be described below, via a first pressure chamber 7, a passage 18, an inertia valve chamber 17, a passage 20, and a second pressure chamber 8 to complete a fluid passage. A plunger 9 provided with a seal 10 is sealingly and slidably received within the cylinder bore 3. A spring 11 having a high spring rate is interposed between the plunger 9 at the left end thereof and the inner wall of the bore 2 to provide resistance to leftward movement of the plunger 9. The plunger 9 includes an intermediate diameter portion 9a and a small diameter portion 9b to define stepped portions with which the spring 11 and a weak spring 16, as will be described below, are concentrically engaged.

A piston 12 provided with a seal 13 is sealingly and slidably mounted in the bore 4. A flange 12a is formed, smaller in diameter than the cylinder bore 3, at the left end of piston 12. A stepped portion 3a is defined at the change in diameter between the cylinder bores 3 and 4. A spring 14 having a spring rate lower than that of the spring 11 acts between the flange 12a of the piston 12 and the stepped portion 3a to urge the piston 12 to the left, thus allowing the latter to abut against the plunger 9.

Numeral 15 indicates an air chamber which is defined by the right end of the piston 12 within the cylinder bore 4. An aperture (not shown) may be formed in the valve body 1 to communicate the air chamber 15 with atmosphere. The spring 16, which constitutes a second spring according to the present invention, acts to overcome the sliding resistance of the plunger 9 and moves the same to the right when the piston 12 is moved to the right against the spring force of the spring 14, which is referred to as a first spring of this invention.

Since the spring force of the spring 11 is substantially higher than that of the spring 14, the spring 11 has a length to be at a position to not act on plunger 9 in the inactuated condition of the control valve.

Numeral 17 is an inertia valve chamber which is connected with the first pressure chamber 7 by means of the passage 18 and with the second pressure chamber 8 through the passage 20. An inertia valve member 19 in the form of a ball or a sphere is received in the chamber 17. It is noted that the valve body 1 is mounted on the vehicle such that the axis L or the moving direction of the valve member 19 intersects with the longitudinal axis H of the vehicle at an angle $\theta$ as shown whereby the inertia valve member 19 is caused to normally abut against the right end of the chamber 17 under its own weight. The passage 20 is provided with a valve seat 21 in the proximity of the chamber 17 to have the inertia valve 19 seated thereagainst to interrupt fluid communication when deceleration of the vehicle exceeds a predetermined value to move the inertia valve member 19 to the left.

The operation of the brake hydraulic control valve arranged as aforementioned will be apparent from the following description.

Normally, inertia valve member 19 is in contact with the inertia valve chamber 17 at the right end thereof so that the passages 18 and 20 communicate with each other thereby allowing the inlet and outlet ports 5, 6 to communicate with each other.

Now, the driver depresses a vehicle brake pedal to allow fluid from the master cylinder to flow through the inlet port 5, the first pressure chamber 7, the passage 18, the inertia valve chamber 17, the passage 20, the second pressure chamber 8, and the outlet port 6 to the brake cylinder for the rear wheel for braking. The front wheel brake is subjected to a direct fluid pressure applied by the master cylinder.

Figure 2:
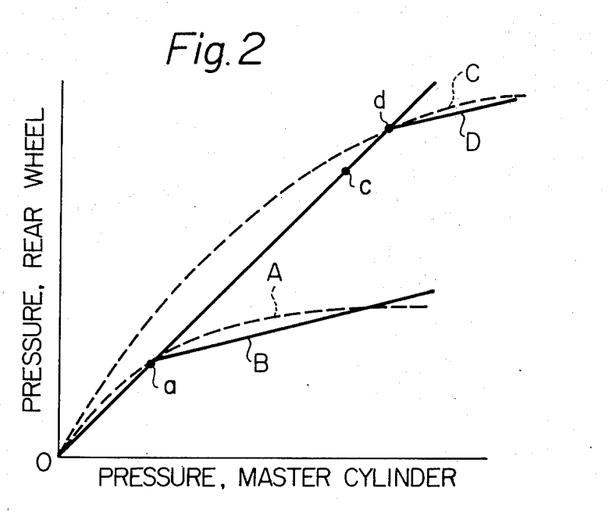
FIG. 2 is a diagram showing the relation between pressure in the rear wheel brake cylinder and the master cylinder connected to the control valve of FIG. 1.

When the vehicle is vacant, the predetermined deceleration condition, that is the pressure condition at which actuation of the inertia valve occurs is at a relatively low pressure such as shown at point "a" in FIG. 2, and the piston 12 is nearly in a position as shown in FIG. 1. Thereafter, pressure from the inlet port 5 is increased to provide a differential pressure between the opposite ends of the plunger 9. In this manner, pressure in the first pressure chamber 7 is increased to tend to move the plunger 9 to the left. At this moment, the spring 11 affords resistance to the plunger so that pressure in the second pressure chamber 8, and accordingly in the rear wheel brake cylinder, is increased at a lower rate than the rate at which the pressure in the first pressure chamber 7, and accordingly in the master cylinder or the front wheel brake cylinder, is increased. Consequently, fluid pressure in the rear wheel brake cylinder is increased at a rate shown by slanting line B in FIG. 2, which is nearly equal to an ideal curve A plotted when the vehicle is vacant.

When the vehicle is "loaded," the predetermined deceleration condition will occur at a point c in FIG. 2 which is higher than the point a in the "unloaded" condition of the vehicle, so that the piston 12 is caused by pressure in the first pressure chamber 7 to urge the first spring 14 to the right. At this moment, the plunger 9 is forced to the right by the second spring 16 and follows the piston 12 to keep the plunger 9 away from the spring 11.

With, the inertia valve member 19 seated on the valve seat 21 and a higher pressure occurring at the inlet port 5, a differential pressure is created across the opposite ends of the plunger 9 to prevent the plunger 9 from moving to the right. With the rise in the pressure in the first pressure chamber 7, of the piston 12 continues to move to the right whereas the plunger 9 becomes spaced from the piston 12. Since there is less resistance to movement of the plunger 9 (the second spring 16 is less strong) until the plunger 9 abuts against the spring 11, the pressure in the second pressure chamber 8 is increased at a rate substantially the same as a rate at which the pressure in the first pressure chamber 7 increases. Then, at a point $d$ in FIG. 2, the plunger 9 abuts against the spring 11 and thereafter the pressure in the second pressure chamber 8 increases at a rate lower than a rate at which the pressure in the first pressure chamber 7 is increased. Consequently, the fluid pressure in the rear wheel brake cylinder is increased as shown by slanting line D to approximate an ideal curve C plotted in FIG. 2 when the vehicle is loaded.

According to the present invention as above described, the effective cut-off point $d$ as shown in FIG. 2 can be determined as desired by suitably selecting the spring froce of the first spring 14, the diameter of the piston 12 and the gas pressure in the chamber 15. It will be noted that the point $c$ in FIG. 2 is determined according to the capacity of the brake system and the weight condition of the vehicle. The control valve of the invention is simple and compact in structure to facilitate its mounting in any vehicle.

Figure 3:
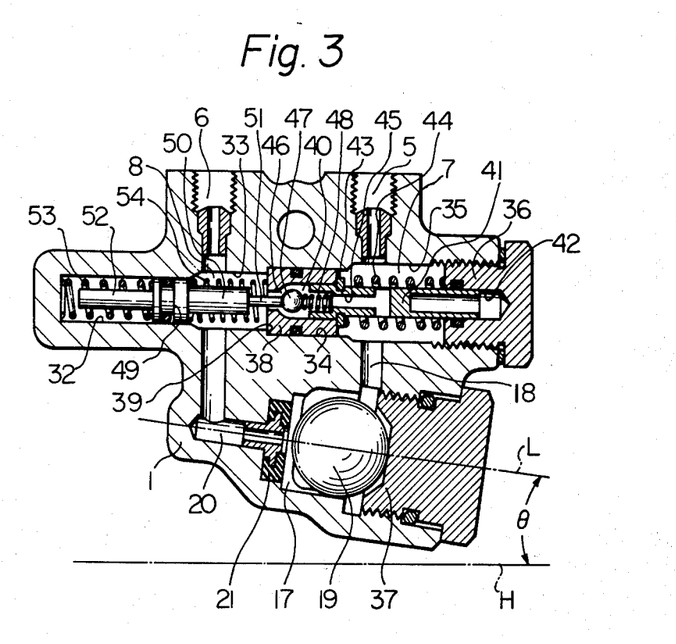
FIG. 3 is a longitudinal cross-section of a second embodiment of this invention.

A further embodiment of the invention is illustrated in FIG. 3 wherein like reference characters designate like or corresponding parts. Since the control valve shown in FIG. 3 is similar to that shown in FIGS. 1 and 2, it is deemed sufficient to describe only the differences.

The valve body 1 is provided, from left to right as viewed in FIG. 3, with a cylinder bore 32 one end of which is closed, a bore 33 made larger in diameter than the cylinder bore 32, a cylinder bore 34 made larger in diameter than the bore 33, and a larger diameter cylinder bore 35 concentrically of each other. The outer end of the cylinder bore 35 is closed by a plug 36 received therein.

The fluid inlet port 5 in communication with a master cylinder (not shown) is open to the first pressure chamber 7 which is defined by the cylinder bore 35. A fluid passage is defined in the valve body 1 by the inlet port 5, first pressure chamber 7, a passage 18, an inertia valve chamber 17, a passage 20, a second pressure chamber 8 defined by the bore 33, and the fluid outlet port 6.

Numeral 37 designates a plug which acts to close the inertia valve chamber 17 for receiving an inertia valve member 19. Although the plug 37 is not shown in FIG. 1, practically such plug is provided.

Numeral 38 denotes a plunger which is sealingly and slidably received in the cylinder bore 34. The plunger 38 is prevented from moving toward the second pressure chamber 8 by a stepped portion 39 which is defined at the change in diameter between the cylinder bore 34 and the bore 33. A bypass passage 40 is formed in the plunger 38 to communicate with the first and second pressure chambers 7 and 8.

Numeral 41 indicates a piston which has one end supported in the bypass passage 40 and the other end sealingly and slidably received in a bore 42 in the plug 36. An annular ring 43 is secured to the piston 41 as shown for abutting with the plunger 38. A spring 44 acting as the first spring of this embodiment of the invention is interposed between the annular ring 43 and the plug 36. The piston 41 is urged to the left by the spring 44 to allow the ring 43 to abut against the plunger 38 whereby the latter is urged to the left and maintained in abutment relation with the stepped portion 39.

A passage 45 is formed in the piston 41 to communicate with the first pressure chamber 7, the passage 40 in the plunger 38 thereby receiving the pressure in the first pressure chamber 7. Thus, the piston 41 is held in a position as shown by the force of the first spring 44 in its inoperative condition. The passage 40 includes a valve seat 46 formed at its left end and receives a valve member 47 in the form of steel ball with a clearance therearound. The valve member 47 is urged in the direction of the valve seat 46 by a weak spring 48 which acts between the valve member 47 and the piston 41. Numeral 49 designates a second piston which is sealingly and slidably received in the cylinder 32. The second piston 49 is integrally provided with a reduced diameter portion 50 and a valve rod 51 within the second pressure chamber 8 and a stopper 52 within the cylinder bore 32. A spring 53 having a high spring rate is disposed in the cylinder bore 32. As a result, the second piston 49 is normally held in a position as shown, and the valve rod 51 is allowed to extend through the valve seat 46 into the passage 40 to keep the valve 47 away from the valve seat 46, thereby maintaining the two pressure chambers 7 and 8 in communication with eath other.

Figure 4:
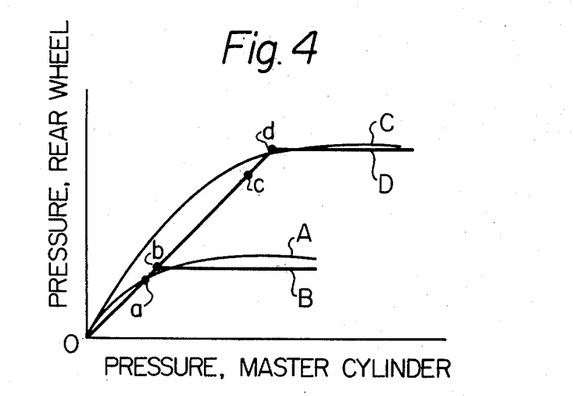
FIG. 4 is a diagram similar to FIG. 2 and showing the operational characteristics of the control valve of FIG. 3.

In this embodiment, the strength of the spring 53 is relatively weak such that when pressure in the second pressure chamber reaches a predetermined pressure as shown in point $a$ in FIG. 4, the piston 49 is moved to the left and the valve rod 51 is retracted out of the passage 40 to have the valve member 47 seated on the valve seat 46 to thereby prevent the communication between the pressure chambers 7 and 8 through the passage 40. Thus minimum pressure $a$ can be assured in the rear wheel brake cylinder regardless of whether the inertia valve is opened or closed.

Numeral 54 is a spring acting as the second spring of this invention and arranged between the plunger 38 and the second piston 49. The spring force of spring 54 is weaker than the first spring 44 and the spring 53 but is great enough to overcome the sliding resistance of the plunger 38. The second spring 54 is adapted to urge the plunger 38 to the right to follow the piston 41 when the pressure in the first pressure chamber 7 is increased to move the piston 41 to the right.

In the inoperative condition, the inertia valve 19 is kept away from the valve seat 21, whereby the first and second pressure chambers 7 and 8 communicate with each other both through the passages 18 and 20 and the bypass passage 40.

Assuming that the brake pedal of the vehicle is depressed to allow fluid from the master cylinder to flow through one circuit composed of the inlet port 5, the first pressure chamber 7, the passage 18, the inertia valve chamber 17, the passage 20, and the second pressure chamber 8 and through the other circuit composed of the inlet port 5, the first pressure chamber 7, the passage 40, and the second pressure chamber 8, the fluid then flows from the outlet port 6 into the rear wheel brake cylinder for applying a braking force to the rear wheels. The front wheels are subjected to a first fluid pressure applied by the master cylinder.

When fluid pressure supplied to the rear wheel brake cylinder reaches a predetermined minimum value (the point a shown in FIG. 4), the second piston 49 is moved to the left and the stopper 52 abuts against the end wall of the cylinder bore 32. This allows the valve rod 51 to move back from the passage 40 to have the valve 47 seated on the valve seat 46 thereby blocking the communication therethrough. At that time the inertia valve is kept open and thus, pressure in the rear brake cylinder is maintained equal to that of the front wheel brake cylinder.

Assuming that the vehicle is in vacant or unloaded condition and deceleration of the vehicle reaches a predetermined value, the inertia valve member 19 seats on the valve seat 21 to prevent communication between the passages 18 and 20 to prevent pressure in the second pressure chamber from further increasing (the point b and line B in FIG. 4).

It will be noted that, at pressure b, the piston 41 and thus the plunger 38 is moved to the right by a small amount, and the outlet pressure is increased by a small amount along with the inlet pressure due to the movement of the plunger 38.

When the vehicle is heavily loaded the inertia valve closes at a pressure shown in point c in FIG. 4 which is higher than in the "unloaded" condition, so that the piston 41 is caused to move to the right urging against the first spring 44 by the fluid pressure in the first pressure chamber 7. The plunger 38 is, thus, moved to the right by the second spring 54 to follow the piston 41 and is spaced from the stepped portion 39.

The closure of the inertia valve 19, 21 results in a differential pressure across the opposite ends of the plunger 38 but, initially, the plunger 38 moves to the left when pressure in the first pressure chamber increases to pressurize fluid in the second pressure chamber 8 until the plunger engages with the stepped portion 39.

Thereafter, pressure in the second pressure chamber is maintained substantially constant and pressure in the rear wheel brake is denoted by line D in FIG. 4. As a result, the effective cut-off point (point d in FIG. 4) in the loaded condition will be substantially increased in the loaded condition due to the first and second valve.

Where the vehicle is running down a steep slope inclined at an angle of more than $\theta$, the inertia valve member 19 due to its own weight will be positioned against the valve seat 21 so that the aforementioned characteristics will not be attained. The rear wheel brake cylinder can be actuaated at the minimum guarantee pressure a which is determined by the area of the second piston 49 to be pressurized and the elasticity of the spring 53. With this arrangement, communication may be established by the bypass passage 40 to obtain the aforementioned operating characteristics of the control valve even if the inertia valve member 19 is initially seated on the valve seat 21. It is noted that the second piston 49 is moved to the left against the bias of the spring 53 to have the valve 47 seat on the valve seat 46 to interrupt communication therein when the fluid pressure in the second pressure chamber 8 reaches the minimum guarantee pressure a.

Figure 5:
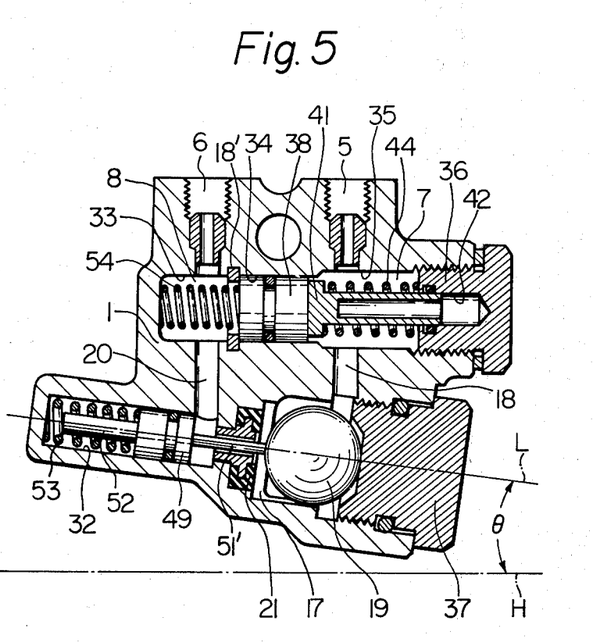
FIG. 5 is a longitudinal cross-sectional view of a third embodiment of the invention.

Another embodiment of the invention is illustrated in FIG. 5 wherein the passage 20 also performs the function of the bypass passage 40 shown in FIG. 3. For this purpose, a valve rod 51' is mounted on the second piston 49 which is arranged concentrically with respect to the inertia valve, and the rod 51' extends through the valve seat 21 with a clearance therearound the projects into the inertia valve chamber 17, thus preventing the valve member 19 from being seated on the valve seat 21 until fluid pressure in the second pressure chamber 8 reaches a predetermined value (minimum guarantee pressure a). Therefore, communication through the fluid passage which comprises the passages 18, 20 and the chamber 17 may be maintained until the pressure in the inertia valve chamber 17, and accordingly in the second pressure chamber 8, reaches the predetermined value a. A ring 18' is provided in the cylinder bore 34 to prevent the plunger 38 from moving into the second pressure chamber 8. All the parts in FIG. 5 except for the above-mentioned perform the same function as the parts shown in FIG. 3. Like reference characters are used to designate like or corresponding parts.

Although FIG. 5 shows the arrangement wherein the second piston 49 is aligned with the rolling axis L of the inertia valve member 19, the invention is not intended to be limited to such an arrangement. Any construction may be employed to prevent the inertia valve member 19 from being closed.

According to the embodiment shown in FIG. 5, a bleeding operation may easily be performed since the valve member 19 is maintained away from the valve seat 21, and liquid introduced into the control valve will effectively drive out trapped air from the inside of the valve body.

Figure 6:
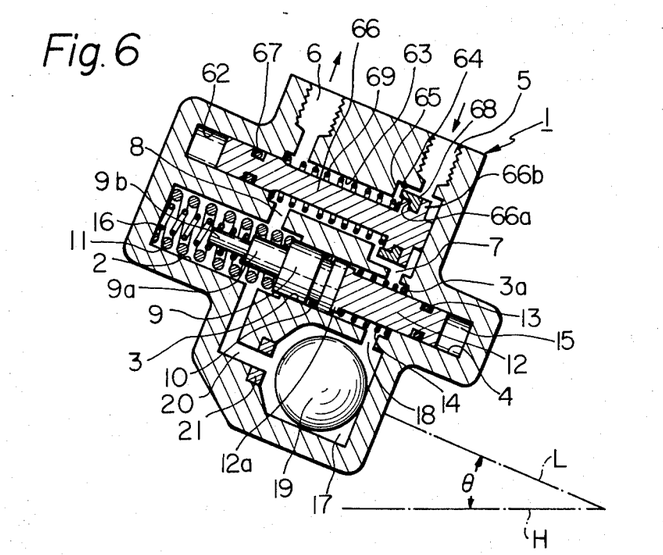
FIG. 6 is a longitudinal cross-sectional view of a fourth embodiment of the invention.

A modified form of the hydraulic control valve shown in FIG. 1 is illustrated in FIG. 6 wherein like reference characters are used to denote like or corresponding parts.

The control valve of FIG. 6 includes bypass means for establishing direct communication between the first and second pressure chambers 7 and 8, which bypass means comprises bores 62, 63, and 64 which are formed separately of the bores 2, 3, and 4 to communicate with one another, a second piston 66 slidably mounted in the bore 62 and having a seal 67, a valve member 68 of elastic material disposed between flanges 66a and 66b of the piston 66 from engaging with a valve seat 65 defined by a shoulder at the step in change in diameter between the bores 63 and 64, and a spring 69 urging the piston 66 to the right to maintain the valve member 68 away from the valve seat 65 in the normal inoperative condition. The clearance between the bore 63 and the piston 66 forms a portion of the second pressure chamber 8, whereas the clearance defined between the bore 64 and the piston 66 forms a portion of the first pressure chamber 7.

In this instance, the area of the piston 66 and the elasticity of the spring 69 are determined so that closing of the valve member 68, namely, leftward movement of the piston 66 can be made under a relatively low pressure a as in the embodiments of FIGS. 3 and 5. This will not influence the variation in pressure plotted in the curves B, D in FIG. 2 but will enable the rear wheel brake to operate without stopping even if the vehicle is running down a step slope inclined at an angle of more than $\theta$.

Figure 7:
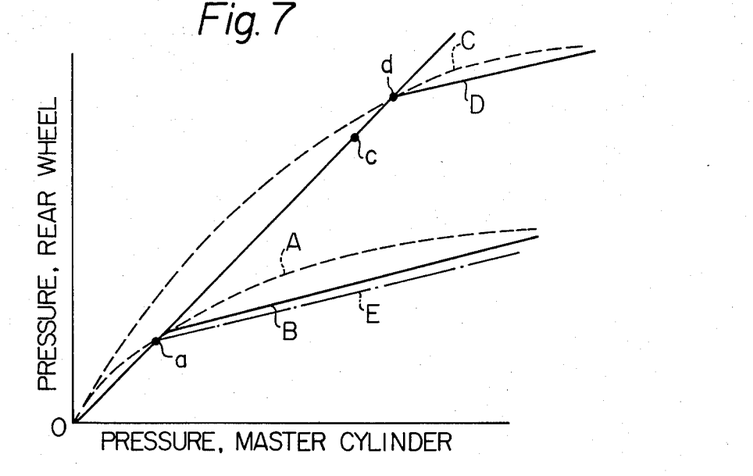
FIG. 7 is a diagram showing the operational characteristics of the control valves of FIGS. 5 and 6.

In contrast to what is shown in FIGS. 3 and 5, in the eembodiment of FIG. 6 pressure in the rear wheel brake cylinder varies along a somewhat inclined line as shown by chain line E in FIG. 7 which is caused by movement of the plunger 9 after the bypaass valve 65, 68 is closed when the vehicle is running down a steep slope.

Figure 8:
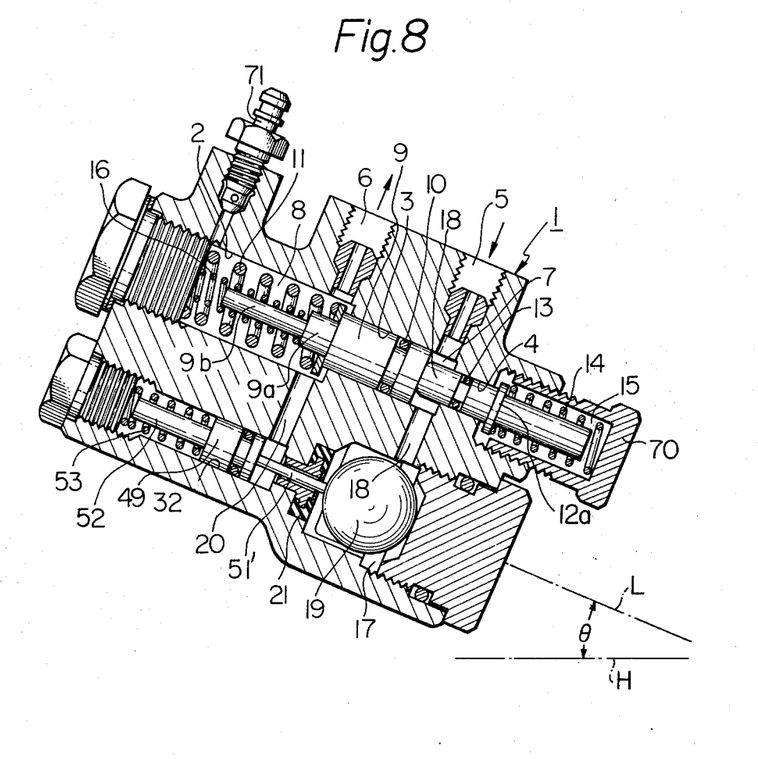
FIG. 8 is a longitudinal cross-sectional view of a fifth embodiment of the invention.

A further modified form of the hydraulic control valve is shown in FIG. 8, wherein like reference characters are used to indicate like or corresponding parts. The hydraulic control valve is shown therein as a combination of the features shown in FIGS. 1 and 5. In this embodiment, the valve rod 51' disposed on the piston 49 functions to prevent the inertia valve 19 from being closed until the pressure reaches the point *a* in FIG. 7, while pressure in the rear wheel brake cylinder will vary along full lines B or D in FIG. 7, depending on whether the vehicle is in the "unloaded" or "loaded" conditions, and along dashed line E when the vehicle is running down a steep slope.

In FIG. 8, numeral 70 denotes a tension adjusting cap for the first spring 14, and numeral 71 is an air bleed fitting.

As described above, the present invention provides a hydraulic pressure control valve which is simple in structure and compact in size and which has an operational characteristic closely approximating that of the ideal valve with respect to the loading of the vehicle.

As will be evident to those skilled in the art, various modifications can be made or followed, in light of the foregoing disclosure, without departing from the spirit or disclosure or from the scope of the claims.

I claim:

1. An inertia-type hydraulic brake pressure control valve for use in a vehicle braking system, said control valve comprising:
    a housing having therein first and second pressure chambers, an inlet communicating with said first pressure chamber and connectable to a vehicle source of hydraulic pressure, and an outlet communicating with said second pressure chamber and connectable to a vehicle rear wheel brake cylinder;
    a fluid passage connecting said first and second pressure chambers;
    inertia valve means positioned within said fluid passage for closing communication therethrough when deceleration of the vehicle exceeds a predetermined value;
    a plunger slidably positioned within a bore in said housing, said plunger having a first end exposed to pressure in said first pressure chamber and a second end exposed to pressure in said second pressure chamber;
    a piston separate from said plunger and slidably positioned within said housing, said piston having a first end always exposed to said pressure in said first pressure chamber during brake operation and a second end exposed to a predetermined reference pressure;
    first spring means mounted within said housing for urging said piston against the force thereon of said pressure in said first pressure chamber, said piston being movable against said first spring means when said pressure in said first pressure chamber exceeds a predetermined value;
    second spring means acting on said second end of said plunger for moving said plunger from a normal unactuated position in a first direction away from said second pressure chamber when said piston is moved against said first spring means and when said pressures in said first and second pressure chambers are equal; and
    means for limiting movement of said plunger in a second direction opposite to said first direction.

2. A control valve as claimed in claim 1, wherein said limiting means comprises third spring means mounted within said housing between said housing and said second end of said plunger, said third spring means being stronger than said first and second spring means.

3. A control valve as claimed in claim 1, wherein said limiting means comprises a fixed abutment surface within said housing at a position to be contacted by said plunger upon movement thereby in said second direction.

4. A control valve as claimed in claim 1, wherein said piston and said plunger are coaxially positioned within said housing, said first end of said piston abutting said first end of said plunger due to said first spring means in an unactuated position of said control when said pressure in said first pressure chamber is insufficient to move said piston against said first spring means.

5. A control valve as claimed in claim 1, further comprising an additional fluid passage connecting said first and second pressure chambers, and pressure responsive valve means for maintaining said additional fluid passage open when said pressure in said first pressure chamber is below a predetermined limit and for closing said additional fluid passage said pressure in said first pressure chamber exceeds said predetermined limit.

* * * * *